Patented Jan. 1, 1929.

UNITED STATES PATENT OFFICE.

HANS STENZL, OF BASEL, SWITZERLAND.

ALKYL AND ARALKYL RESORCINOL CARBOXYLIC ACIDS.

No Drawing.   Application filed June 1, 1927, Serial No. 195,868, and in Germany June 4, 1926.

It is a known fact that among the 4, C-alkyl- and 4, C-aryl-alkyl derivatives of 1.3-dihydroxybenzene there are products which possess strong germicidal properties. The terms C-alkyl and C-aryl-alkyl indicate that the alkyl and the aryl-alkyl group are attached to a carbon atom of 1.3-dihydroxybenzene. An attempt to render these products useful in therapy was unsuccessful, because on the one hand they irritate the mucous membrane and possess an exceedingly disagreeable taste, whereas on the other hand infections of the uro-genital system are but slightly influenced by their administration, even if it extends over a long period. The reason for this is that these derivatives, on their passage through the human body, become wholly paired. Only with toxic dosages the unpaired bodies partly appear in the urine.

It has now been found that the carboxylic acids corresponding with the resorcine derivatives just mentioned not only possess strong disinfecting properties even in neutral solution, but that they pass unchanged through the human body. Moreover, the irritating action of the starting materials is no longer present. It is known that when phenol is converted into salicylic acid the starting materials almost entirely lose their germicidal properties. Sodiumsalicylate is only a very weak disinfectant; thus for instance a 5% solution of sodiumsalicylate is unable to destroy staphylococci within three hours, whereas concentrated solutions of 0.1% of 4, β-phenyl-ethyl-1.3-dihydroxybenzene-6-carboxylate of sodium are sufficient for destroying them within an hour.

The manufacture of the carboxylic acids of the 4, C-alkyl- and 4, C-aryl-alkyl derivatives of 1.3-dihydroxybenzene consists in treating the starting materials in presence of alkali with carbondioxide.

The carboxylic acids thus obtained are crystallized compounds which dissolve difficultly in cold water, more easily in organic solvents. They are to be used as products for internal disinfection.

Example 1.

20 parts of 4, β-phenyl-ethyl-1.3-dihydroxybenzene are heated with 200 parts of water and 75 parts of sodium bi-carbonate during 6 hours to 140° C. under pressure. After cooling unchanged 4, β-phenyl-ethyl-1.3-dihydroxybenzene is separated by filtering and from the solution the carboxylic acid thus obtained is precipitated with mineral acid. The acid, which immediately crystallizes, is re-crystallized from plenty of water to which is added some coal, and is then obtained in colourless needles, which, on being quickly heated, melt at about 208° C., decomposition setting in at the same time. With ferric chloride the acid shows a deep blue colouring.

Example 2.

11 parts of metallic sodium are dissolved in 120 parts of absolute alcohol; to this solution are added in an air-tight container 120 parts of 4, β-phenyl-ethyl-1.3-dihydroxybenzene. The mixture is then evaporated in vacuo until it has become absolutely dry and the solid residue treated with carbon-dioxide during 3 hours under pressure of 3 atmospheres and at a temperature of 100–120° C. After cooling 60 parts of concentrated hydrochloric acid are added and the mixture stirred with 300 parts of benzol. The benzol is then removed and separated from the carboxylic acid by stirring with a solution of bi-carbonate, from which the free acid is obtained by acidifying.

Example 3.

70 parts of 4, β-p-brom-phenyl-ethyl-1.3-dihydroxybenzene, obtained through condensation of p-brom-benzyl-cyanide with resorcine, saponifying the p-brom-benzyl-resorcyl-ketimide to p-brom-benzyl-resorcyl-keton and reducing according to Clemmensen, its melting point being 142° C., are dissolved in a solution of 5.57 parts of sodium and 150 parts of absolute alcohol. The alcohol is then distilled off in a hydrogen current under reduced pressure and the remaining product heated during 5 hours with carbon-dioxide to 130° C. After dissolving in water carbonic acid is passed in until the phenolphtaleine reaction has disappeared, the unchanged 4, β-p-brom-phenyl-ethyl-1.3-dihydroxybenzene is extracted with ether and the carboxylic acid precipitated with mineral acid. It can be decolorated in ether with charcoal and recrystallized from benzol. If the isomeric acids are to be separated, the reaction product is dissolved in a solution of soda, the crystallizing, difficultly soluble sodium salt of γ-4, β-p-brom-phenyl-ethyl-1.3-dihydroxybenzene-2-carboxylic acid filtered off and the 4, β-p- brom - phenyl-ethyl-1.3-dihydroxybenzene-6-carboxylic acid (melting point 204° C., ferric reaction in alcohol violet) precipitated from the lye. The sodium salt is converted into the free 2-carboxylic acid in the usual manner (melting point 181° C., ferric reaction blue).

*Example 4.*

21 parts of 4-heptyl-1.3-dihydroxybenzene are dissolved in a solution of 2.3 parts of sodium and 30 parts of absolute alcohol. The alcohol is evaporated in a hydrogen current under reduced pressure and the remaining product heated with carbon-dioxide during 8 hours to about 90° C. After dissolving in water and neutralizing with carbonic acid, the unchanged heptyl-resorcine is removed with ether and the aqueous solution treated with a mineral acid in order to separate the carboxylic acid. When the precipitate is dry, the 4-heptyl-1.3-dihydroxybenzene-2-carboxylic acid is obtained by recrystallizing from chloroform and ligroine in colourless lamina melting at 109–110° C. The lye contains an isomeric acid melting at 163–165° C.

*Example 5.*

72.3 parts of 4-benzyl-1.3-dihydroxybenzene are dissolved in 200 parts of absolute alcohol and treated with a solution of 8.5 parts of sodium and 125 parts of absolute alcohol in a hydrogen current; the alcohol is then evaporated in vacuo, the residue after cooling slowly heated with carbon-dioxide to 120–130° C. and left at this temperature for 4 hours. The further treatment consists, as in the case of 4, β-p-brom-phenyl-ethyl-1.3-dihydroxybenzene-carboxylic acid, in introducing carbonic acid into the aqueous solution until the phenolphtaleine reaction has disappeared and separating the unchanged starting material. The product thus obtained after acidifying is decolorated in a solution of ether and recrystallized from benzol. The acid crystallizes in white needles melting at 160° C. and shows with ferric chloride a blue colouring. The principal quantity consists of the 4-benzyl-1.3-dihydroxybenzene-2-carboxylic acid.

I claim:

1. As new products for internal disinfection, carboxlic acids of the C-alkyl and C-aryl-alkyl derivatives of dihydroxybenzene.

2. As new article of manufacture 4, β-phenyl-ethyl-1.3-dihydroxybenzene-6-carboxylic acid, the new product consisting of colourless needles which, on being heated quickly, melt at about 208° C., dissolving difficultly in cold water, more easily in organic solvents and showing with ferric chloride a deep blue colouring.

3. As a new article of manufacture the product phenyl-ethyl-dihydroxybenzene-carboxylic acid.

In witness whereof I have hereunto set my hand.

HANS STENZL.